US008323550B2

(12) United States Patent
Bumen

(10) Patent No.: US 8,323,550 B2
(45) Date of Patent: Dec. 4, 2012

(54) METHOD FOR CONSTRUCTING A BRIDGE DECKING PANEL

(76) Inventor: James H. Bumen, Chillicothe, OH (US)

( * ) Notice: Subject to any disclaimer, the term of this patent is extended or adjusted under 35 U.S.C. 154(b) by 0 days.

(21) Appl. No.: 13/251,765

(22) Filed: Oct. 3, 2011

(65) Prior Publication Data

US 2012/0018921 A1 Jan. 26, 2012

Related U.S. Application Data

(62) Division of application No. 12/331,504, filed on Dec. 10, 2008, now Pat. No. 8,069,519.

(51) Int. Cl.
*B29C 39/10* (2006.01)

(52) U.S. Cl. ......................... 264/263; 264/261; 264/333

(58) Field of Classification Search ........................ None
See application file for complete search history.

(56) References Cited

U.S. PATENT DOCUMENTS 1,984,944 A 12/1934 Piccirilli
4,282,619 A 8/1981 Rooney
4,300,320 A 11/1981 Rooney
4,531,859 A 7/1985 Bettigole
4,604,841 A 8/1986 Barnoff et al.
4,706,318 A 11/1987 Huber et al.
4,710,994 A 12/1987 Kishida et al.
4,972,537 A 11/1990 Slaw, Sr.
4,982,538 A * 1/1991 Horstketter ..................... 52/259
4,991,248 A 2/1991 Allen
5,025,522 A 6/1991 Eskew et al.
5,107,650 A * 4/1992 Patrick ............................ 52/336
5,339,475 A * 8/1994 Jaeger et al. ...................... 14/73
5,457,839 A 10/1995 Csagoly
5,457,840 A 10/1995 Derechin
5,577,284 A 11/1996 Muller
5,617,599 A 4/1997 Smith
5,634,308 A 6/1997 Doolan
5,682,635 A 11/1997 Tolliver et al.
5,802,652 A 9/1998 Smith
5,826,290 A 10/1998 Kokonis
5,850,653 A 12/1998 Mufti
5,901,396 A 5/1999 Ahlskog
5,920,936 A 7/1999 Wiedeck et al.
5,940,916 A 8/1999 Sauvageot
5,978,997 A 11/1999 Grossman
6,073,293 A 6/2000 Ahlskog et al.
6,081,955 A * 7/2000 Dumlao et al. ................... 14/73
6,170,105 B1 1/2001 Doyle et al.
6,381,793 B2 5/2002 Doyle et al.
6,453,495 B1 9/2002 Meggers et al.
6,708,362 B1 3/2004 Allen
6,857,156 B1 2/2005 Grossman
7,207,079 B2 * 4/2007 Kennedy .......................... 14/73

* cited by examiner

*Primary Examiner* — Edmund H. Lee
(74) *Attorney, Agent, or Firm* — Frank H. Foster; Kremblas & Foster

(57) ABSTRACT

Bridge decking panels are cast in a form that has at least one and preferably two or more channel-forming sheets attached to the bottom wall of the form and extending from wall to wall. Each sheet is dimensioned to receive an anchor plate assembly and form a channel in the cast concrete between runner bars.

5 Claims, 4 Drawing Sheets

Fig. 1
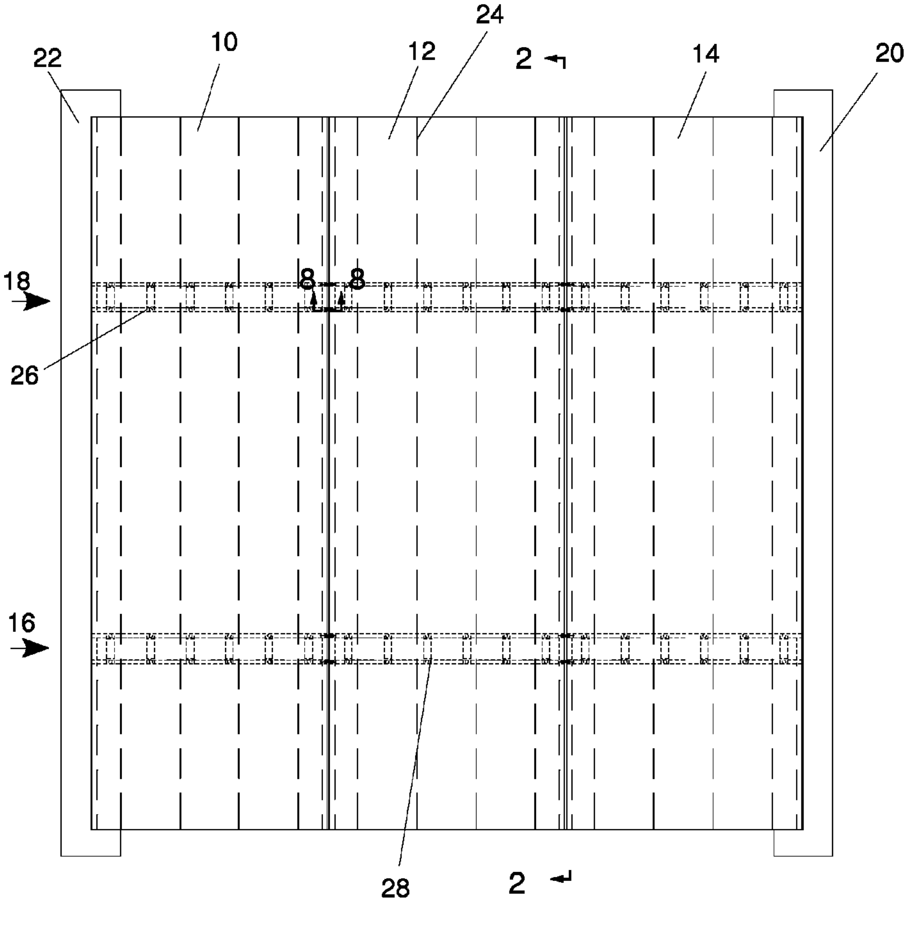
Fig. 2
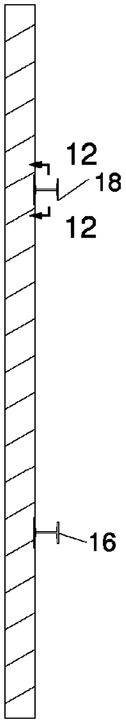
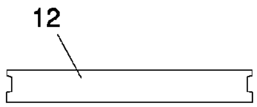
Fig. 3

Fig. 4
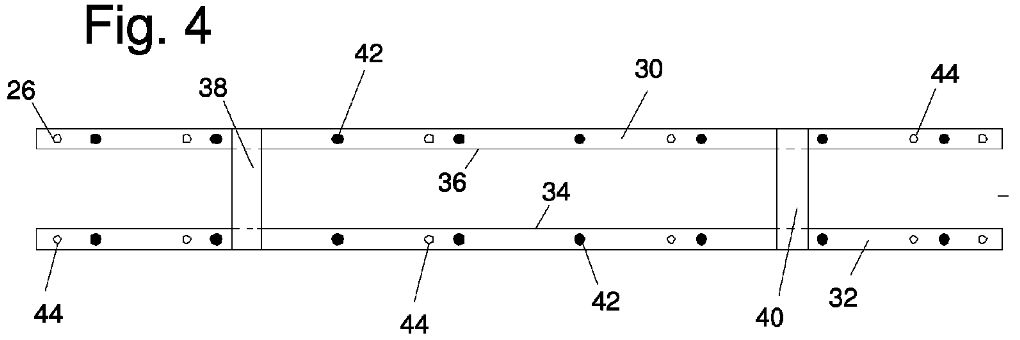
Fig. 5
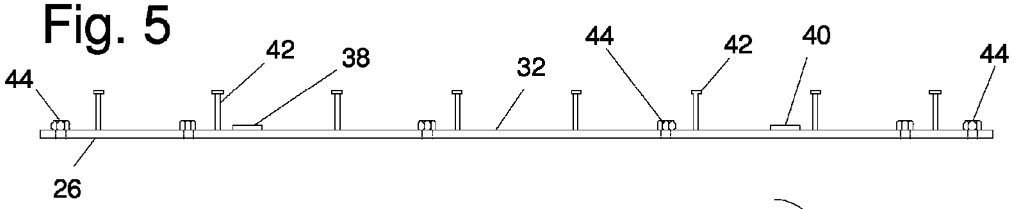
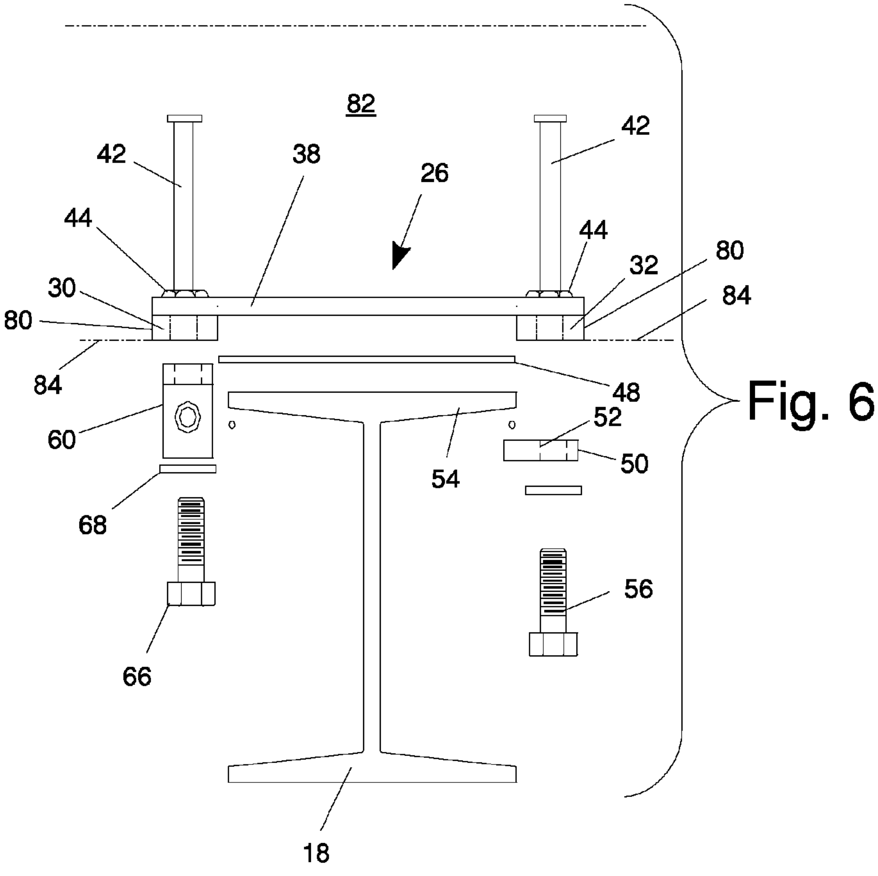
Fig. 6
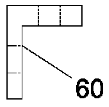
Fig. 7

Fig. 8
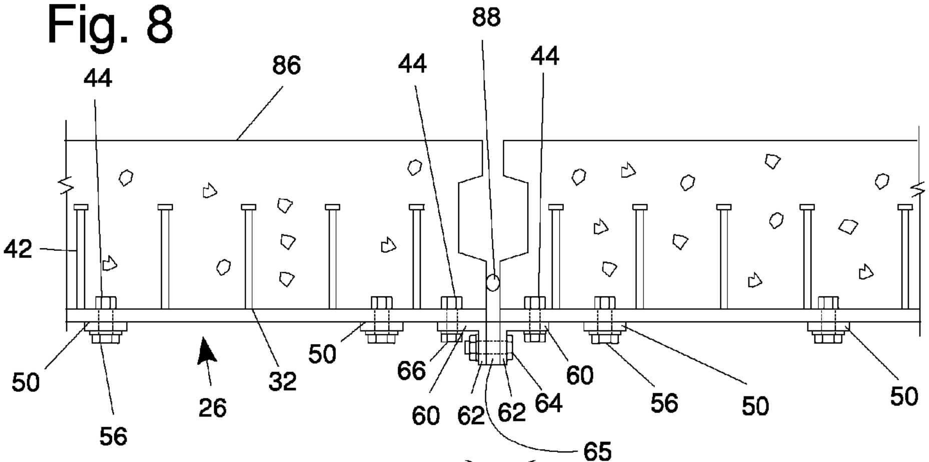
Fig. 9
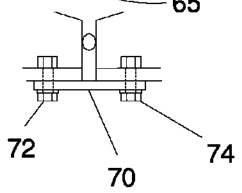
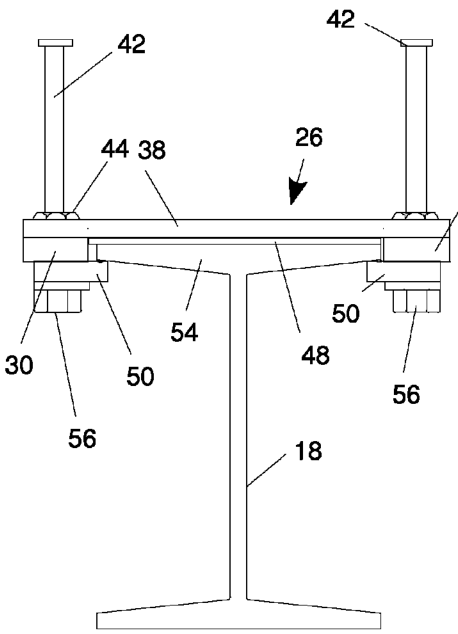
Fig. 10
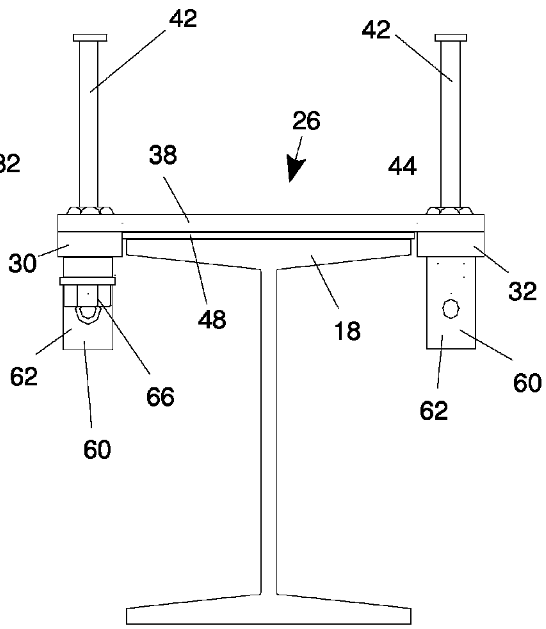
Fig. 11

Fig. 12
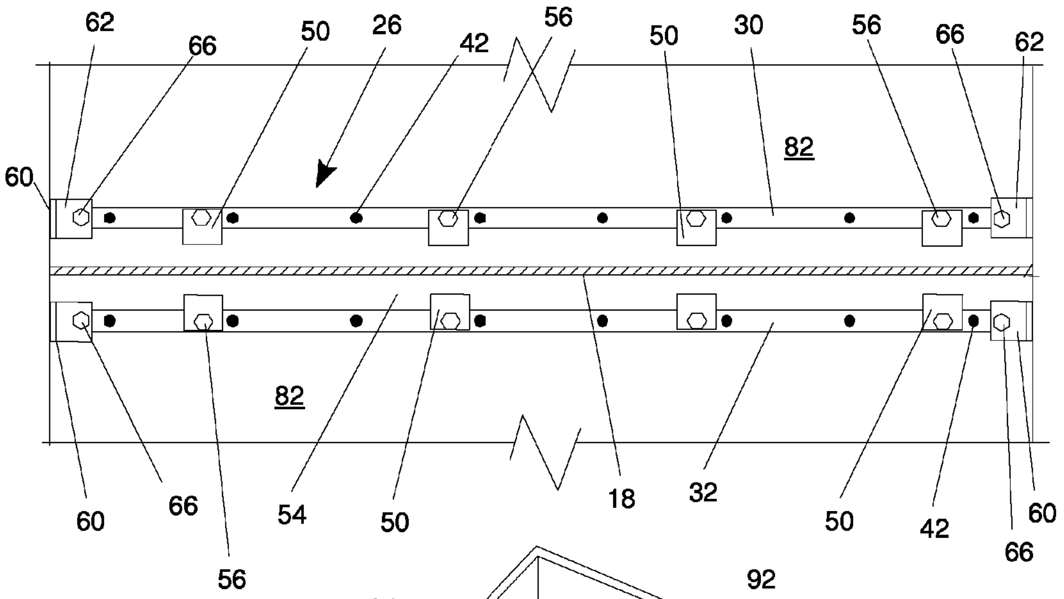
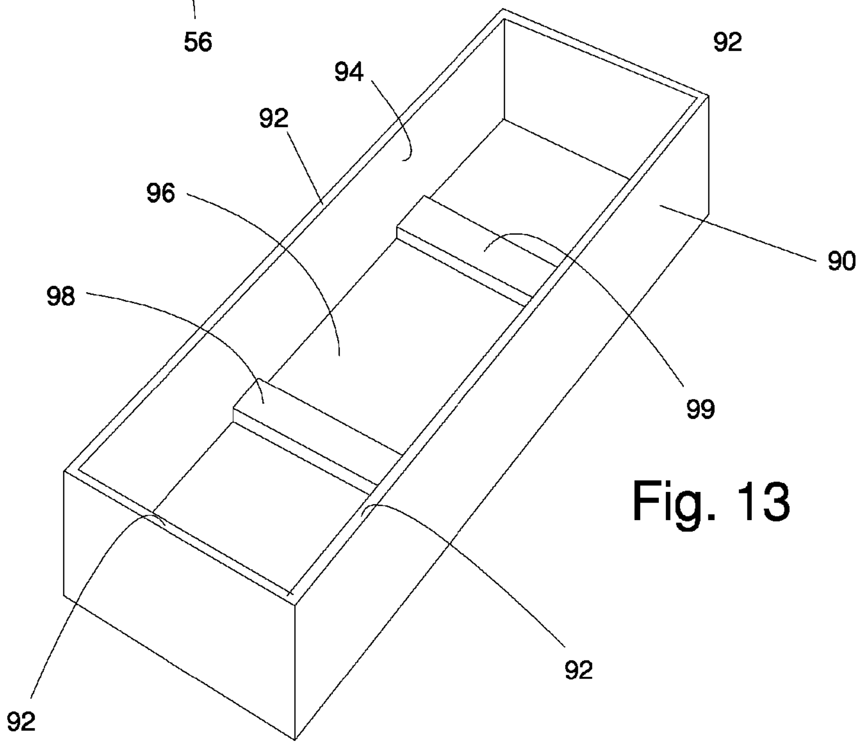
Fig. 13

METHOD FOR CONSTRUCTING A BRIDGE DECKING PANEL

CROSS-REFERENCES TO RELATED APPLICATIONS

This application is a division of application Ser. No. 12/331,504 filed 10 Dec. 2008 and now U.S. Pat. No. 8,069, 519.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to static structures and more particularly to precast decking panels and associated connecting structures that are used as components of bridges.

2. Description of the Related Art

In the construction of bridges, the traffic supporting deck is often formed of discrete decking panels formed of precast concrete with steel reinforcement and additional structures for mounting and supporting them on the bridge. The precast decking panels are supported on the bridge beams and positioned side by side and sometimes end to end across the bridge.

An advantage of precast bridge decking panels is that they can be manufactured in a controlled environment and under closely controlled manufacturing parameters instead of being formed in place at a bridge site where their fabrication is subject to unpredictable, variable or harsh weather conditions and where transportable equipment is required for forming the bridge decking. Consequently, precast bridge decking panels can be fabricated to meet uniform size and high quality standards. Also, in the event of a decking failure, the uniformity and transportability of decking panels allows the relatively rapid replacement of one or more decking panels in a bridge, thereby minimizing the length of time that a bridge is closed for repairs.

Some of the most desirable characteristics of a bridge decking panel design are ease of installation, durability over years of use, stability under both normal traffic and under unusual adverse conditions, and ease of replacement in the event of a failure. One problem that has been experienced with some prior art decking panels is that the decking panels are attached to the supporting beams with structures, including bolts or studs, that require a hole in the concrete. After installation, the hole is filled with a grout material. Unfortunately, with the passage of time the grout material sometimes comes out to the hole as a result of bridge vibration caused by traffic and, in cold climates, also caused by freezing and thawing of water that seeps into cracks in the grouting. Loss of the grout leaves a hole in the deck and exposes the attachment structures to water, and in some climates to salt, which allows corrosion of the attachment parts and can also permit movement of the decking panels.

As with most construction projects, ease of installation is important because it translates into a reduction of the time required to install the decking panels and therefore results in a lowering of the cost of a project. However, ease of installation can not compromise bridge and decking panel strength and integrity. Both safety and bridge longevity require that the decking be held securely in place on the support beams and also resist any relative movement of the decking with respect to its support beams as the bridge withstands years of vibration and loading from traffic, especially from heavy vehicles. Stability requires that the bridge decking panels be constructed and attached to the beams in a manner that strongly resists lateral or longitudinal movement of the deck panel on its support beam, twisting or bending of the support beams and lifting from the support beams in the event of flood conditions.

Ease of replacement of a decking panel is desirable because, if a decking panel can be easily and rapidly removed and replaced, both the repair cost and the length of time that a bridge is out of service or partially closed for repairs are minimized.

It is therefore an object and feature of the invention to provide a precast decking panel that has no holes through the deck and has no structural or load supporting structures that are covered by or encased in a grout material.

It is another object and feature of the invention to provide a bridge decking panel with a fastening system and structures that can be installed easily and quickly.

It is another object and feature of the invention to provide bridge decking panels that are fastened in a secure and stable manner to the bridge support beams and to each other in a manner the resists relative motion of the decking panels with respect to the support beams.

It is yet another object and feature of the invention to provide a bridge decking panel that can be easily removed from its installed location on a bridge to permit its replacement within a relatively short time interval, such as overnight, and to do so without damaging bridge components that remain on the bridge for fastening a new decking panel in place on the bridge.

It is still another object and feature of the invention to provide a bridge decking panel that permits abutting panels to be connected together end to end by a continuous steel connection across the entire bridge.

Another object and feature of the invention is to provide a method for constructing bridge decking panels in accordance with the present invention.

BRIEF SUMMARY OF THE INVENTION

The invention is a bridge decking panel and associated connecting structures that attach bridge decking panels to bridge beams that support them and to each other. A paving material is cast around at least one and typically two anchor plate assemblies. The bottom surface of each anchor plate assembly is exposed at the bottom exterior of the decking panel. Each anchor plate assembly has a pair of parallel runner bars extending across the bottom of the decking panel. These runner bars are spaced apart a distance equal to the sum of the width of a supporting bridge beam plus a tolerance distance so that a bridge beam can be received in the channel formed between the runner bars when the decking panel is lowered onto the beams. At least one and preferably multiple cross bars transversely span and are fixed to the runner bars. Several studs are fixed to the runner bars or the cross bar or both and extend into the paving material to hold the anchor plate assembly to the paving material. Several first fastener components, such as conventional nuts, are fixed to the runner bars at spaced intervals along their length. Each first fastener component is adapted for engagement with a mating second fastener component such as a machine screw. The decking panel also has a panel to beam connecting structure. With the decking panel resting upon a beam, several clamping plates extend from beneath a runner bar to beneath a portion of the bridge beam. A mating second fastener component engages each clamping plate and mates with one of the first fastener components in order to clamp the anchor plate assembly, and therefore the entire decking panel, to the bridge beam. The bridge decking panels also have end connecting structures for attaching abutting edges of adjacent decking panels together. Each end connecting structure has an end link extending from alignment with a first fastener component at an edge of one of the adjacent decking panels to alignment with a first fastener component at an edge of the other adjacent decking panel. A pair of mating second fastener components engage each end of the end link and also engage the first fastener components at the edges of the adjacent decking panels to fasten the end link to the abutting panels. The invention also includes a method for casting bridge decking panel in accordance with the invention. A form is constructed having sidewalls with an inner surface configured in the desired size and shape of the outer sidewalls of the bridge decking panel. The form also has a bottom wall for forming most of the bottom surface of the decking panels. At least one and preferably two channel-forming sheets of material are attached to the bottom wall of the form. Each channel-forming sheet has dimensions so that an anchor plate assembly can be set upon and straddle each channel-forming sheet with close enough tolerances to prevent a flowable paving material, such as concrete, from entering a space between the channel forming sheet and the anchor plate assembly when paving material is inserted into the form and around each anchor plate assembly to cast the decking panel.

BRIEF DESCRIPTION OF THE SEVERAL VIEWS OF THE DRAWINGS

FIG. 1 is a top plan view of a bridge having three bridge decking panels constructed according to the preferred embodiment of the invention.

FIG. 2 is a view in vertical section taken substantially along the line 2-2 of FIG. 1.

FIG. 3 is an end view of a bridge decking panel illustrated in FIG. 1.

FIG. 4 a top plan view of an anchor plate assembly according to the preferred embodiment of the invention.

FIG. 5 is a view in side elevation of the anchor plate assembly illustrated in FIG. 4.

FIG. 6 is an exploded end view of an anchor plate assembly resting upon a bridge beam and illustrating the preferred panel to beam connecting structure and the preferred end connecting structure embodying the invention.

FIG. 7 is a side view of a component of the end connecting structure illustrated in FIG. 6.

FIG. 8 is a view in vertical section taken substantially along the line 8-8 of FIG. 1 and illustrating a portion of the preferred embodiment illustrated in FIG. 1.

FIG. 9 is a view like FIG. 8 but illustrating an alternative end connecting structure that is not preferred.

FIG. 10 is a vertical side view looking in the direction 2-2 of FIG. 1 but with the end connecting structure removed to illustrate the preferred panel to beam connecting structure.

FIG. 11 is a vertical side view looking in the direction 2-2 of FIG. 1 but with the panel to beam connecting structures removed to illustrate the preferred end connecting structure.

FIG. 12 is a bottom view in section along the line 12-12 of FIG. 2 and illustrating the panel to beam connecting structures and the end connecting structures illustrated in other figures.

FIG. 13 is a view in perspective of a form used for casting bridge decking panels in accordance with the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

FIGS. 1-3 illustrates a bridge having three prefabricated bridge decking panels 10, 12 and 14 in accordance with the preferred embodiment of the invention. The three decking panels 10, 12 and 14 are all attached to and supported on two bridge beams (not visible in FIG. 1 or 3) at locations 16 and 18. The bridge beams are supported on spaced bridge abutment walls 20 and 22 in the conventional manner.

Each bridge decking panel is a slab that includes a cast paving material that can be cast in a form or mold and is preferably conventional concrete of the type used in the prior art for casting prefabricated bridge decking panels. One preferred decking panel has a nominal width is 7' 11½" and nominal length of 24 feet but can be any useful size for use with the invention.

Each decking panel is also reinforced with wire mesh or rebar 24. A pair of parallel anchor plate assemblies 26 and 28 are cast on the underside of each panel. The anchor plate assemblies 26 and 28 are cast within the paving material but have a bottom surface that is exposed at the bottom exterior of the decking panel. There is one anchor plate assembly in each decking panel for each bridge beam that will support the decking panel.

Referring now to FIGS. 4-12, each anchor plate assembly, such as anchor plate assembly 26, is constructed of a pair of parallel runner bars 30 and 32 extending along the decking panel. These runner bars 30 and 32 are spaced apart by a distance equal to the sum of the width of a supporting bridge beam 18 plus a tolerance distance. This makes the distance between their inner proximal edges 34 and 36 just enough larger than the width of the supporting beam that the supporting beam can fit snugly between the runner bars 30 and 32. The "tolerance distance" is a matter of some engineering judgment but is enough to allow the top of the beam, for example the flange of an I beam, to seat in the space between the runner bars, despite variations in width and linearity of the beam. For example, a tolerance distance of ¼ inch is believed appropriate.

Preferably, the runner bars 30 and 32 extend continuously between opposite edges of the decking panel, preferably across substantially the entire the width of the decking panel. Although that is preferred, the runner bars could terminate an inch or some other distance from the edge that is inconsequential to their function. The runner bars should extend close enough to the edge of the decking panel to allow use of an end connecting structure, which is described below, if the end of the decking panel will abut another decking panel. Similarly, the runner bars could be constructed in shorter segments and there could be short intervals with no runner bar between them. However, that is not preferred because such runner bars would be weakened and would make fabrication of the anchor plate assembly more expensive.

A pair of cross bars 38 and 40 transversely span and are fixed to the runner bars 30 and 32, preferably by welding. As alternatives, there can be more cross bars or there can be a single plate extending along some or all of the length of the runner bars 30 and 32. The principal purpose of the cross bars 38 and 40 is to hold the runner bars 30 and 32, when the decking panel is cast, in their parallel orientation at the selected spacing between them. They also assist in retaining the runner bars against movement after the decking panel is mounted on the support beam and the bridge is completed. The cross bars 38 and 40 are positioned on the upper side of the runner bars 30 and 32 in order to allow formation of a channel running along and between the runner bars 30 and 32 and avoid blocking that channel.

Several studs 42 are fixed to the runner bars 30 and 32 and extend into the paving material after the decking panel is cast. Preferably the studs 42 are welded to the runner bars 30 and 32 although various other fastening means can be use, such screw threads. The studs can additionally or alternatively be fixed to the cross bars 38 and 40. In the event that a single long plate is used as the cross bar, the studs can be fixed along the longitudinal centerline of the anchor plate assembly, but this is not preferred. Studs of this nature are well known in the prior art and their purpose with the invention is to hold the concrete paving material to the anchor plate 26.

A plurality of first fastener components 44 are also fixed to the runner bars 30 and 32 at spaced intervals along the length of each runner bar. Each first fastener component 44 is adapted for engagement with a mating second fastener component. The preferred first fastener component is a conventional threaded nut welded to an upper surface of a runner bar adjacent to and aligned with a hole through the runner bar. This allows a machine screw or bolt to be threadedly fastened to the nut for use as described below. Alternatively, the first fastener components can be threaded holes through the runner bars so that a screws or bolts can be similarly fastened to the runner bars. Other types of fasteners may be used.

Referring now to FIGS. 6-11, the anchor plate assembly of the invention permits the decking panels to be easily and quickly but securely attached to both the supporting bridge beams and to the end of an abutting decking panel. The anchor plate assembly also permits these attachments to later be easily and quickly disconnected so that a damaged decking panel can be replaced without damage to the remaining bridge components.

As viewed in FIGS. 6 and 10-12, a bridge beam 18 is received between the runner bars 30 and 32 and lies longitudinally along the channel formed between two runner bars 30 and 32 of each anchor plate assembly 26. Preferably, a rubber pad 48 is interposed between the bridge beam 18 and the anchor assembly 26. Because the bridge beams are uneven on top, the pad 48 functions as a cushion or gasket of a compressible solid material, such as an elastomeric material, that permits some pad material flow under the high pressure in order to distribute the load on the beam more uniformly.

After a bridge decking panel is lowered onto the bridge beams with a portion of a bridge beam fitting in the channel between the runner bars 30 and 32 of the anchor plate assemblies, the decking panel can be connected to those bridge beams. For that purpose, panel to beam connecting structures are provided that include a plurality of clamping plates 50. Each clamping plate 50 has a hole through it and extends from beneath a runner bar 30, 32 to beneath a portion of the bridge beam 18, preferably beneath the upper flange 54 of an I-beam.

Each clamping plate 50 is secured in place to a runner bar 30, 32 by a mating second fastener component 56 that engages each clamping plate 50 and mates with one of the first fastener components 44. The mating second fastener components 56 and its associated clamping plate 50 clamp the anchor plate assembly to the bridge beam 18. The preferred mating second fastener components 56 are machine screws or bolts that are tightened into the preferred nuts 44 that are welded on the top surface of the runner bars 30 and 32. The preferred I-beams typically have flanges 54 that are tapered. Preferably, the runner bars 30 and 32 are approximately the thickness of the flanges at their edges, or slightly thicker, so that the clamping plates 50 are simple flat plates that are most easily clamped against the flanges 54.

In order to use the bridge decking panels of the invention for a wider bridge, or for a bridge that uses decking panels of a shorter length, end connecting structures are provided for attaching abutting ends of adjacent decking panels together at their end edges in end to end relationship. Each end connecting structure has an end link 60 with holes at its opposite ends and extending from alignment of one hole with a first fastener component at an edge of one of the adjacent decking panels to alignment of the other hole with a first fastener component at an edge of the adjacent decking panel.

The preferred end link 60 has two 90° angle brackets 62 with each bracket 62 having a pair of legs and a hole in each leg. A first hole of each angle bracket is aligned with a first fastener component at the edge of a different one of the abutting decking panels. A fastener 64, such as a machine screw and nut, extends through the second hole of each angle bracket 62 and fastens the two angle brackets together. A steel separator plate 65 with a hole is desirably interposed between the angle brackets 62. A mating second fastener component, preferably a machine screw 66 with a washer 68, extends through the hole at each end of the end link 60 and also engages the first fastener components 44 at the edges of the adjacent decking panels to fasten the end link to the abutting panels. FIG. 11 shows, on its left side, an angle bracket 62 and the far side of the illustrated decking panel and, on its right side, shows the angle bracket 62 at the near side of the decking panel. As an alternative, the separator plate 65 can be eliminated and the legs of the angle brackets 62 that are parallel to the decking surface can be extended so that the modified angle brackets seat against each other and are bolted together by a fastener.

FIG. 9 illustrates an alternative, but not preferred, end link 70. The end link 70 is a flat steel plate with a hole in each end. The mating second fastener components are machine screws 72 and 74 which similarly connect together the abutting ends of the decking panels.

Referring to FIG. 6, an advantageous feature of the invention is attained by casting the paving material so that it extends against the top surfaces of the anchor plate assembly 26 and against the distally opposite outer sides 80 of the runner bars 30 and 32. This allows the paving material to support the runner bars 30 and 32 against lateral movement and also positions the channel that is between the runner bars 30 and 32 so that it is recessed above the bottom surface of the decking panels. This recessed configuration not only provides a cleaner, smoother and simpler appearance, but also helps prevent water from seeping into the space between the bridge beams and the decking panels. Avoiding water between the interfacing surfaces minimizes both corrosion in that portion of the bridge and the small movements caused by alternate freezing and thawing of water. Most preferred is to cast the paving material 82 on the anchor plate assembly 26 so that the lower surface 84 of the paving material 82 is flush with the lower surface of the runner bars 30 and 32.

All of the component of the anchor plate assembly, as well as all the other components that have been described, except for the paving material, are constructed of steel. Where practical, these components can be galvanized or otherwise treated to minimize corrosion. Although machine screws and nuts are the preferred fastener components, other fasteners current known, such as rivets, or developed in the future may be used.

In addition to those already described, embodiments of the invention offer additional advantages over the prior art that include the following. Because the channel in which the beam is received is recessed, the clamping plates can be simple, flat, tab-like plates. If the fasteners holding the clamping plates fall out as a result of vibration caused by traffic across the bridge, the beam is still held in the channel and the fasteners can easily be replaced. The channel, with its steel walls formed by the runner bars and restrained by the concrete on the outer sides of the runner bars, keeps the decking panels from sliding laterally and restrains the bridge beams against lateral bending.

The clamping plates that are clamped to the underside of the bridge beam flanges hold the decking panels down on the bridge beams. That prevents the decking panels from rising, for example from being lifted as a result of a flood. That also prevents the minor uplift of a portion of a decking panel caused by a heavy truck crossing the bridge. Such uplift is caused by the wheel of a heavy vehicle pushing down on one place on the decking panel and causing an uplift at another place by a lever and fulcrum effect. The clamping of the bridge beams to the underside of the decking panels also helps keep the bridge beam from twisting about its longitudinal axis.

Embodiments of the invention lock everything together. They hold the panels to the beam and to the other panels against all three directions of motion. The decking panels are connected together by a continuous steel component connection extending across the entire bridge.

Embodiments of the invention have no holes in the panels themselves so they have no grouting in the panel itself to protect and encase structural components. The only grouting in bridges constructed from embodiments of the invention is in the gap between the decking panels. This gap is filled with grout from the decking surface 86 down to the gasket 88 (FIG. 8). If this grouting comes out, the structural components that hold the bridge together and in place and are not compromised or affected. Therefore, loss of the grouting does not allow the bridge decking panels to move.

Another important feature of the invention is realized if a panel breaks down or is damaged and needs to be replaced. A repair crew needs to do only two things to disconnect a decking panel from the bridge. First, they must remove or break off the heads of the mating second fastener components, such as the screws 56, to remove the clamping plates 50. That leaves the bridge beam in its original condition ready to be connected in the same manner as described above to a replacement decking panel embodying the invention. Second, the crew must unscrew, break off or cut off the fasteners that connect the end connecting structures to the damaged panel. This can most easily be accomplished with a concrete saw that can cut through the grout, the steel separator plate 65 and the fastener 64 to cut away the parts of the end connecting structure. If the alternative, extended angle brackets are used, the saw can cut through them and then the remaining piece of the angle bracket on the decking panel that will remain on the bridge is unbolted from the remaining decking panel. Then the crew lifts out the damaged panel, replaces it with new decking panel, connects the replacement panel to the remaining decking panels and grouts the gaps at opposite sides of the new panel in the same manner as described above. All of the parts that connect the panel to the bridge beam are independent of the bridge beam. The damaged panel can be disconnected without any damage to the component parts on the remaining decking panels. Consequently, a bridge panel can be replaced overnight and thereby minimize the time of closure of the bridge or a side of the bridge.

In addition to the above features and advantages of the bridge decking panel structures described above, bridge decking panels that embody the invention are advantageously fabricated by the following method. This method is particularly desirable when fabricating a plurality of identical bridge decking panels. Referring to FIG. 13, a form 90 is constructed having outer sidewalls 92 with an inner surface 94 that is configured in the desired size and shape of the outer sidewalls of a bridge decking panel. The form 90 also has a bottom wall 96 for forming most of the bottom surface of the decking panels.

At least one but preferably two channel-forming sheets 98 and 99 are fastened to the bottom wall 96 of the form 90. The channel-forming sheets 98 and 99 extend from a sidewall 92 to an opposite sidewall entirely across the interior of the form 90. The sheets 98 and 99 have a width and a height to form a channel in the underside of the decking panel. The height and width of the sheets 98 and 99 approximately correspond to the height and width of the channel formed between the runner bars of the invention.

An anchor plate assembly, that is constructed in accordance with the invention as described above, is then set upon and straddles each of the channel-forming sheets 98 and 99. Consequently, the width of the channel-forming sheets 98 and 99 should be slightly smaller than the distance between the runner bars by a tolerance distance that avoids a friction fit of the anchor plate assembly upon the channel-forming sheets but is small enough to avoid entry of paving material into a space between the channel forming sheet and the anchor plate assembly. The height of the channel-forming sheets is preferably substantially equal to the thickness of the runner bars 30 and 32 for the same reasons.

A flowable paving material is then inserted into the form and around the anchor plate assembly and the exposed surfaces of the anchor forming sheets 98 and 99. Before inserting the paving material into the form, it is desirable to block any openings in the first fastener components, such as nuts welded to the runner bars, to prevent entry of paving material.

A plurality of identical bridge decking panels are sequentially cast using the identical form 90 by removing each decking panel from the same form after each decking panel is cast and then repeating the above process. As a result, all the anchor plate assemblies have the identical position in every cast panel for the bridge for which the panels are being cast.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for constructing a bridge decking panel using a paving material that can be cast, the method comprising:

(a) constructing a form having outer sidewalls with an inner surface configured in the desired size and shape of the outer sidewalls of the bridge decking panel and having a bottom wall for forming most of the bottom surface of the decking panels;

(b) fastening a channel-forming sheet of material to the bottom wall of the form, the sheet extending from a sidewall to an opposite sidewall entirely across the form, the sheet having a width and a height to form a channel in the underside of the decking panel;

(c) setting upon the channel-forming sheet an anchor plate assembly comprising:

(i) a pair of parallel runner bars resting upon the bottom wall of the form and extending longitudinally along the channel-forming sheet, the runner bars being spaced apart a distance substantially equal to the width of the channel-forming sheet;

(ii) at least one cross bar transversely spanning and fixed to the runner bars;

(iii) studs fixed to the runner bars or a cross bar or both and extending upwardly for being encased in the paving material; and (iv) a plurality of first fastener components fixed to the runner bars at spaced intervals, each first fastener component adapted for engagement with a mating second fastener component; and (d) inserting a flowable paving material into the form and around the anchor plate assembly that is set upon the channel-forming sheet.

2. A method in accordance with claim 1 and further comprising: welding the cross bars on the upper side of the runner bars.

3. A method in accordance with claim 2 and further comprising: before inserting the paving material into the form, blocking any openings in the first fastener components to prevent entry of paving material.

4. A method in accordance with claim 3 wherein the method further comprises:

(a) fastening a plurality of parallel channel-forming sheets of material to the bottom wall of the form, each sheet positioned and configured as aforesaid;

(b) setting upon each channel-forming sheet an anchor plate assembly positioned and configured as aforesaid; and (c) inserting a flowable paving material into the form and around each anchor plate assembly that is set upon a channel-forming sheet.

5. A method in accordance with claim 4 and further comprising: sequentially casting a plurality of identical bridge decking panels including removing each decking panel from the same form after the decking panel is cast.

* * * * *